(12) United States Patent
Guo

(10) Patent No.: US 8,493,634 B2
(45) Date of Patent: Jul. 23, 2013

(54) METHOD FOR AUTOMATICALLY IDENTIFYING SCAN REGION BOUNDARY

(75) Inventor: Xian-Qiang Guo, Suzhou (CN)

(73) Assignee: Qisda (Suzhou) Co., Ltd, Suzhou, Jiangsu Province (CN)

( * ) Notice: Subject to any disclaimer, the term of this patent is extended or adjusted under 35 U.S.C. 154(b) by 383 days.

(21) Appl. No.: 12/870,852

(22) Filed: Aug. 30, 2010

(65) Prior Publication Data

US 2011/0063692 A1 Mar. 17, 2011

(30) Foreign Application Priority Data

Sep. 12, 2009 (CN) .......................... 2009 1 0176303

(51) Int. Cl.
*H04N 1/04* (2006.01)

(52) U.S. Cl.
USPC .......... 358/474; 358/488; 358/3.27; 358/505; 382/282; 382/219

(58) Field of Classification Search
USPC ............... 358/488, 474, 3.27, 3.26, 475, 509, 358/501, 505; 382/282, 219, 319, 312, 254, 382/275, 167
See application file for complete search history.

(56) References Cited

U.S. PATENT DOCUMENTS

| 4,226,540 | A | * | 10/1980 | Barten et al. | 356/445 |
|---|---|---|---|---|---|
| 5,880,858 | A | * | 3/1999 | Jin | 358/487 |
| 5,978,519 | A | * | 11/1999 | Bollman et al. | 382/282 |
| 6,144,467 | A | * | 11/2000 | Tsai | 358/486 |
| 6,178,015 | B1 | * | 1/2001 | Lee et al. | 358/486 |
| 6,556,721 | B1 | * | 4/2003 | Wang et al. | 382/282 |
| 7,268,753 | B2 | * | 9/2007 | Lee et al. | 345/77 |
| 7,466,459 | B2 | * | 12/2008 | Kuo | 358/474 |
| 7,889,395 | B2 | * | 2/2011 | Goto et al. | 358/3.27 |
| 8,073,262 | B2 | * | 12/2011 | Hirohata | 382/218 |
| 8,116,513 | B2 | * | 2/2012 | Minami et al. | 382/100 |
| 8,159,716 | B2 | * | 4/2012 | Kondo et al. | 358/1.9 |
| 8,174,731 | B2 | * | 5/2012 | Hasegawa et al. | 358/3.24 |
| 8,368,875 | B2 | * | 2/2013 | Kludas et al. | 356/5.01 |
| 8,387,860 | B2 | * | 3/2013 | Arakawa | 235/375 |

FOREIGN PATENT DOCUMENTS

CN 1189733 8/1998

\* cited by examiner

*Primary Examiner* — Negussie Worku

(57) ABSTRACT

A method of automatically identifying a scan region boundary, used for scanning a document under a non-unified background, includes: reading a reference linear scan data by a scanning device, the scanning device analyzing brightness values in each row of the reference linear scan data and determining a reference range value according to the brightness values in each row; and during scanning a document, the scanning device comparing brightness values of a linear scan data with the reference range value so as to determine the scan region boundary. The method confirms the scan boundary of a document and is not subjected to a backlight element or a document carrier. The method identifies the boundary of a document under a non-unified background, is applicable to scanning transparent and reflective documents and has strong resistance against environmental interference, not only simplifying the scanning device but also enhancing the automatic performance.

11 Claims, 5 Drawing Sheets

METHOD FOR AUTOMATICALLY IDENTIFYING SCAN REGION BOUNDARY

This application claims the benefit of People's Republic of China application Serial No. 200910176303.8, filed Sep. 12, 2009, the subject matter of which is incorporated herein by reference.

BACKGROUND OF THE DISCLOSURE

1. Field of the Disclosure

The disclosure relates in general to a scanning method of a scanning device, and more particularly to a method of automatically identifying a scan region boundary for non-unified background and with the capability of overcoming backlight interference.

2. Description of the Related Art

Most of the scanning devices adopt user/manual browsing and boundary setting for confirming a scan boundary of a document. The setting of document boundary includes operations such as marking and width setting, which need to be implemented via the display device and the input device. The boundary setting for implementing the above operation method is not applicable to small and portable scanners which are not equipped with the auxiliary apparatus, such as computers.

An apparatus capable of implementing automatic identification of the boundary of a document normally relies on an interface with constant identification background color. Sensing element of the apparatus senses whether the interface is blocked by a document and confirms the scan boundary according to the change in the image of the interface. However, the scanning device must have a unified background identification interface (for example, a roller within the scan region of the scan photo-electrical element is changed to a bi-color roller with identification function). The scan photo-electrical element confirms the left/right boundary of the document by sensing the change in the interface having constant identification background color via the bi-color roller within the scan region.

As for prior scanning devices, such as the scanning device capable of scanning transparent document, a backlight element is disposed on the opposite of the scan module and used for generating a light penetrating the transparent document for enabling the scan module to scan the transparent document. With the existence of the backlight element, the above method for determining the left and the right boundary of the reflective document is not applicable. In general, scanners with multiple scan functions execute the appended scanning function via a document carrier. Under such circumstance, the appended scanning carrier will affect the scan boundary and further the determination of the left and the right scan boundary. Furthermore, it is still very difficult for the prior scanning devices to have a unified background primary color, so any minute change in the background color would affect the accuracy in the determination of the scan boundary based on the unified background primary color.

SUMMARY OF THE DISCLOSURE

One embodiment of the disclosure is directed to a method of automatically identifying the scan region boundary for confirming the scan boundary during scanning of a reflective document. When scanning a document under a non-unified background, the method precisely determines the scan boundary of the scan document, particularly, the left boundary and the right boundary.

The details of the technology adopted in embodiments of the disclosure are disclosed below.

Provided is a method of automatically identifying a scan region boundary, used for scanning a document under a non-unified background, including: reading a reference linear scan data by a scanning device, the scanning device analyzing brightness values in each row of the reference linear scan data and determining a reference range value according to the brightness values in each row; and during scanning a document, the scanning device comparing brightness values of a linear scan data with the reference range value so as to determine the scan region boundary.

The reference linear scan data is a linear scan data obtained by scanning the non-unified background when no document is loaded.

The step of comparing the brightness values includes: comparing the brightness values of each linear scan data with the reference range value on the same physical location, wherein the reference range value is a reference range obtained by upward and downward expansion of the brightness values in each row of the reference linear scan data.

The method of automatically identifying the scan region boundary further includes: when comparing brightness values of each linear scan data with the reference range value point by point, if the brightness value of a continual pixel point in a linear scan data exceeds the reference range value on the same physical location, the scanner device confirming a position of the continual pixel points as a left boundary or a right boundary of the scan document region of the document entering into a scan range.

The method of automatically identifying the scan region boundary further includes: when comparing brightness values of each linear scan data with the reference range value point by point, if the brightness values of at least two or three continual pixel points in a linear scan data exceed the reference range value on the same physical location, the scanner device confirming a position of the continual pixel points as a left boundary or a right boundary of the scan document region of the document entering into a scan range.

The scanning device further determines physical locations of the continual points in each linear scan data whose brightness values exceed the reference range value; a continual point having a leftmost physical location is determined as the left boundary of the scan document, and a continual point having a rightmost physical location is determined as the right boundary of the scan document.

Provided is a method of automatically identifying a scan region boundary, used for scanning a document under a non-unified background, including: reading a reference linear scan data by a scanning device, the scanning device analyzing brightness values in each row of the reference linear scan data and determining a first reference range value according to the brightness values in each row; the scanning device determining whether a document carrier is loaded into the scanning device, wherein if the document carrier is already loaded, then the scanning device reads a linear scan data from a documentless region on the document carrier, analyzing brightness values in each row of the linear scan data and determining a second reference range value according to the brightness values in each row; and during scanning the document, the scanner device comparing brightness values of a linear scan data with the second reference range value so as to determine the scan region boundary.

The method of automatically identifying the scan region boundary further includes: sensing and confirming whether the document enters into the scan region by a sensing element of the scanning device.

The method of automatically identifying the scan region boundary further includes: the scanning device scanning the document to obtain a plurality sets of linear scan data, wherein the scanning device analyzes each set of the linear scan data, and confirms a top boundary and a bottom boundary of the document according to an effective data width of each set of the linear scan data exceeding the second reference range value.

The method of automatically identifying the scan region boundary further includes: trimming and outputting a scan image by the scanning device according to the left boundary and the right boundary as well as the top boundary and the bottom boundary.

The scanning device scans the scan background with a scan module to obtain a reference linear scan data and obtains a reference range value from an appropriate value expansion based on the average brightness of each row in the reference linear scan data. With regard to the background color, the average brightness of the reference linear scan data on each physical location is confirmed. Next, each set of linear scan data is obtained in each linear scanning performed subsequently, wherein the scanning device computes the brightness values in each row in each set of linear scan data, and compares the brightness values of each row in the same physical location and a corresponding reference range value so as to confirm the scan boundary of the document according to the result of comparison.

The details of the above method of determining the boundary are disclosed below. In comparing the subsequent scan data with the reference scan range value, if the brightness of a continual point of the subsequent scan data in the same physical location exceeds the corresponding reference range value, then it is confirmed that the scan document is located within the scan range. The scanning device analyzes the continual points in each set of linear scan data whose brightness values exceed a reference range value; the continual points having a leftmost location is defined as a left boundary of the document; and the continual points having a rightmost location is defined as a right boundary of the document. The continual point could be realized by a single pixel. In the above determination method, the determination that the brightness value of a single pixel exceeds a reference brightness value could be erroneous due to the error determination by the scanning device or the interference of environmental factors. Thus, the disclosure uses continual points as the basis of correction. For example, the determination is based on whether the brightness values of at least two or three continual entities exceed a reference average value, hence avoiding errors in determination.

As for the document with scan carrier, the disclosure adopts a linear scan data of the document carrier as a reference linear scan data under no document condition, the reference range value is determined and document boundary is obtained according to the above comparison method.

The boundary determination method is applicable in scanning the reflective document by the scanning device having transparent and reflective document scanning function whose determination accuracy and result are not affected by the scan backlight. Also, the determination of the document boundary is not affected by the difference in the average brightness values of the reference linear scan data at different positions.

By comparing brightness values of each pixel row of each subsequent scan data with the reference linear scan data, the top boundary and the bottom boundary of the document are determined. Regardless of whether the document is transparent or reflective, after the document is loaded into the scan region, the resulting linear scan data have many continual points whose brightness values exceed the reference range value. Meanwhile, the width of the physical location of the many continual points whose brightness values exceed the reference range value (that is, the effective data width of the many continual points whose brightness values exceed the reference range value) could be used as a basis of determination. That is, when the respective width of the physical location on the leftmost side and on the rightmost side are near close to the left boundary and the right boundary of the document that are previously confirmed, the linear scan data is determined as the scan data of an initial scan boundary of the document. To the contrary, after the document leaves the scan region, in comparing a linear scan data obtained by scanning after the document leaving the scan boundary, and with the reference range value, the effective data width is enough small for indicating that (1) there is no continual point whose brightness value exceeds the reference range value; (2) or even if there are continual points, the width of the physical location of the continual points at the outmost side is smaller than a predetermined value.

Embodiments of the disclosure have the following advantages. The method confirms the scan boundary of a document and is not subjected to a backlight element or a document carrier. Further, the method identifies the boundary of a document under a non-unified background. Even further, the method is applicable to scanning transparent and reflective documents, and has strong resistance against environmental interference; thereby not only simplifying the scanning device but also enhancing the automatic performance.

The disclosure will become apparent from the following detailed description of the preferred but non-limiting embodiments. The following description is made with reference to the accompanying drawings.

DETAILED DESCRIPTION OF THE DISCLOSURE

The method of automatically identifying the scan region boundary is applicable to confirming the scan boundary during the scanning of a reflective document or a transparent document. In scanning a document under a non-unified background, the methods of embodiments of the disclosure precisely confirm the scan boundary of the scan document, particularly, the left boundary and the right boundary. The technology of embodiments of the disclosure is exemplified by the drawings and the disclosures below.

Figure 1:
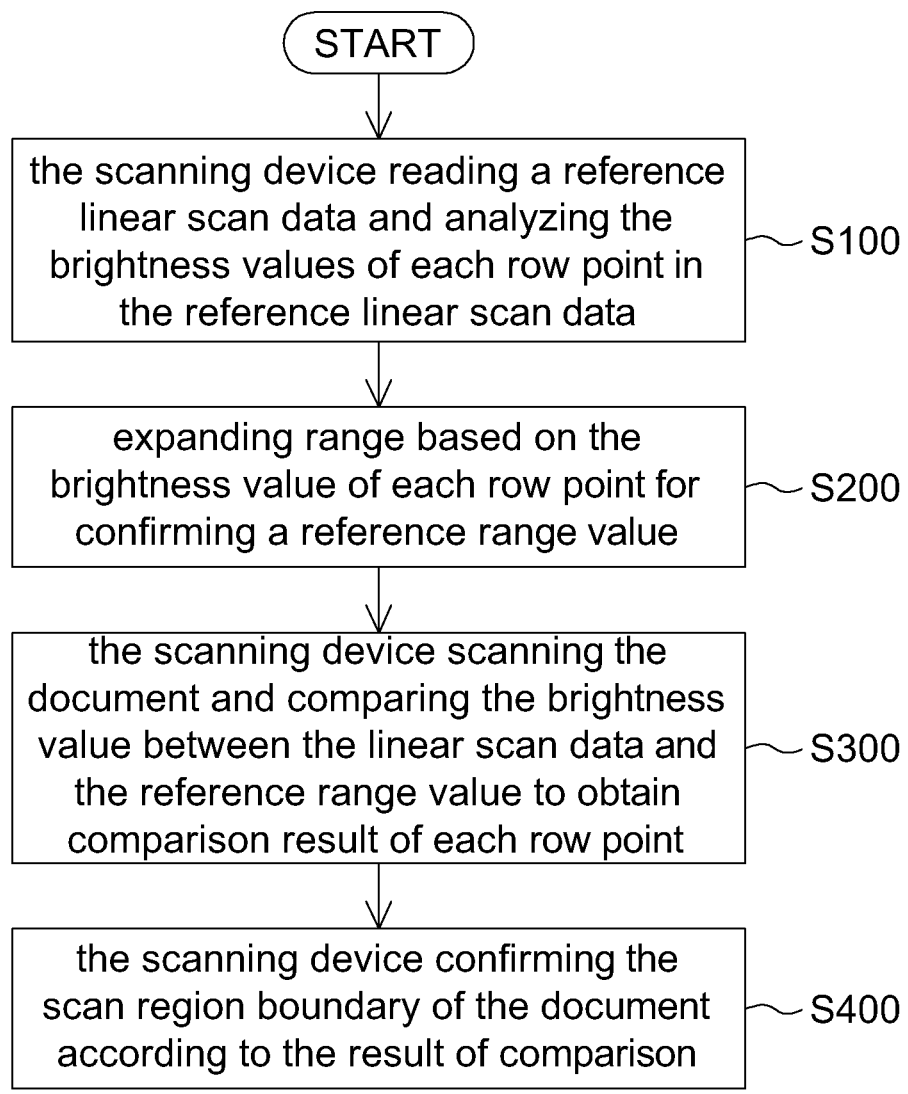
FIG. 1 shows a flow chart of a method of automatically identifying the scan region boundary according to an embodiment of the disclosure.

As indicated in FIG. 1, the scanning device can be realized by a multi-functional scanner capable of scanning reflective and transparent document. A backlight element is disposed on opposite side of the scan module. With the existence of the backlight element, the scan background of the scan module is a non-unified multi-color background. At step S100, the scanning device reads a reference linear scan data and analyzes the brightness values of each row point in the reference linear scan data. Since different scanning devices have different scanning accuracy, the row point can be defined as width of a single pixel or a total width of several pixels. In fact, the row point can be reasonably set according to the scanning accuracy. Next, at step S200, the brightness value of each row point is expanded by the scanning device based on the brightness value of the each row point (or said, each reference row point) in the reference linear scan data for confirming a reference range value, wherein the difference between the reference range value of the each row point and the brightness value of the reference row point can be adjusted according to different brightness value. For example, for each row point with smaller individual RGB averages, the reference range value can be realized by the brightness value plus or minus 26 (±26); and for each row point with larger individual RGB average, the reference range value can be realized by the brightness value plus or minus 30 (±30).

Then, at step S300, the scanning device continues scanning and performs the comparison of the brightness value between the subsequently-scanned linear scan data and the reference range value until the loaded document is scanned. Lastly, at step S400, the scan region boundary of the document is confirmed by the scanning device according to the comparison of the linear scan data.

Figure 2:
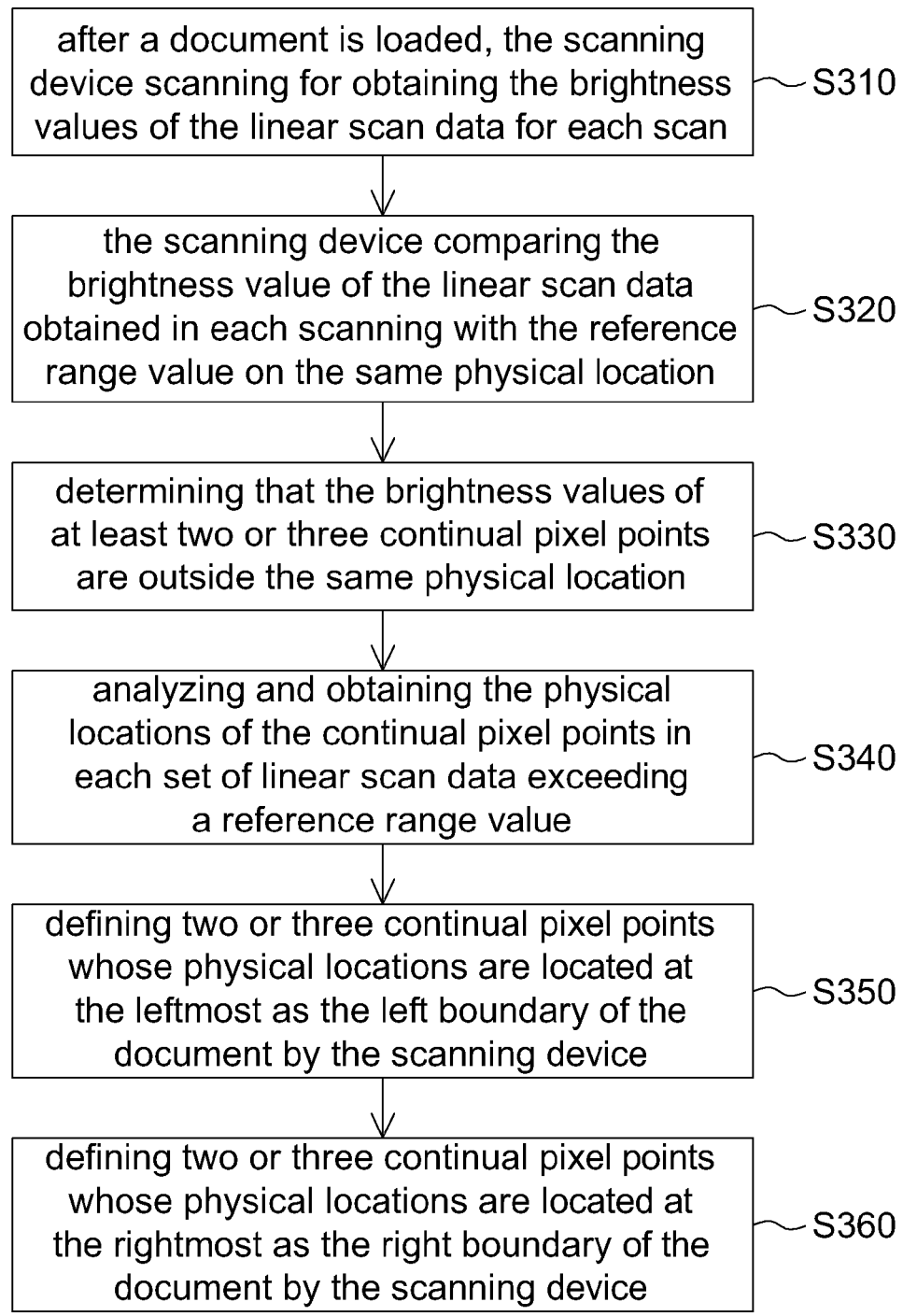
FIG. 2 shows a flow chart of steps S300 and S400 of FIG. 1 according to the embodiment of the disclosure.

The details of the method for performing comparisons on each subsequently-scanned linear scan data and the reference range value and for determining the left and the right boundary are illustrated in FIG. 2. Firstly, at step S310, after a document is loaded, the scanning device scans the document for obtaining the brightness values of the linear scan data for each scan, wherein the brightness values match the row points of the reference range value. Next, at step S320, the scanning device compares the brightness value of the linear scan data obtained in each scanning with the reference range value on the same physical location. Here, each row point is defined by a pixel point. Then, at step S330, according to the comparison result, the scanning device determines the physical location of at least two or three continual pixel points whose average brightness value are outside the reference range value. If such continual pixel points exist, then it is determined that an image region of a document enters into the scan region. If there are no such continual pixel points, then it is determined that the image region of the document has not entered the scan region yet. After that, at step S340, among all subsequently-scanned linear scan data, the physical locations of the continual pixel points whose average brightness value are outside the reference range value are obtained by the scanning device. At steps S350 and S360, two or three continual pixel points whose physical locations are located at the leftmost end of the document are used as the left boundary of the document by the scanning device, and two or three continual pixel points whose physical locations are located at the rightmost end of the document are used as the right boundary of the document by the scanning device. Thus, the left boundary and the right boundary of the document are confirmed. In the method of determining the left and right boundary, after a document enters into the scan range, the document scan data on the same physical location will have different brightness level from the background scan data on the same physical location; and the scan data is compared with the reference scan data range to accurately confirm the left boundary and the right boundary of the document, instead of adding extra sensors or operation buttons to the scanner. By collecting many sets of linear scan data, the method of automatically identifying the scan region boundary eliminates determination errors that may occur due to determination based on a single set of linear scan data, so that the identification of the scan region boundary can be done automatically with higher accuracy.

Figure 3:
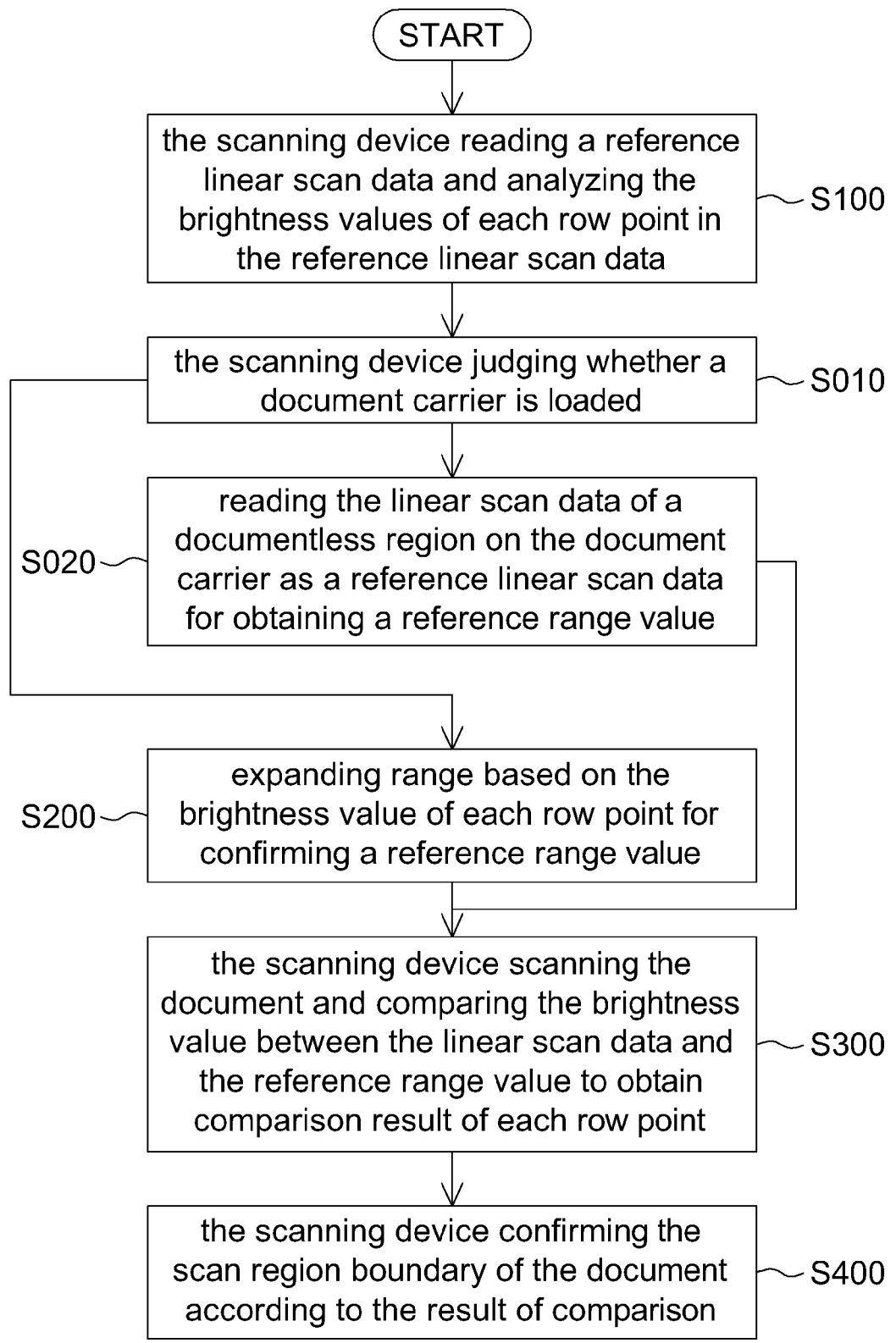
FIG. 3 shows a flow chart of a method of automatically identifying the scan region boundary according to another embodiment of the disclosure.

As for the prior scanner, particularly, the portable scanner, a document carrier is adopted for increasing scanning function but simplifying operation buttons. The scanner scans the document carrier for obtaining the identification information on the document carrier so as to execute corresponding appended functions. In another embodiment, as indicated in FIG. 3, in scanning the document carrier, at step S100, the scanning device reads out a reference linear scan data; and the brightness values of the pixel points in each row of the linear scan data are obtained. Next, at step S010, whether a document carrier is loaded is determined by the scanning device. If no document carrier is loaded, then the subsequent steps as illustrated in the first embodiment are performed. If a document carrier is already loaded, then the method proceeds to step S020; and the scanning device reads the linear scan data of a documentless region on the document carrier as a reference linear scan data for obtaining a reference range value through expansion. Then, the scanning device scans and compares the brightness values of the linear scan data obtained from each scanning with the reference range value. After that, steps of confirming the scan region boundary of the document is like the first embodiment. Since the document carrier is used as a document background color, the scanning device identifies the demarcation between the document and the document carrier so as to prepare the subsequent scanning and trimming.

Figure 4:
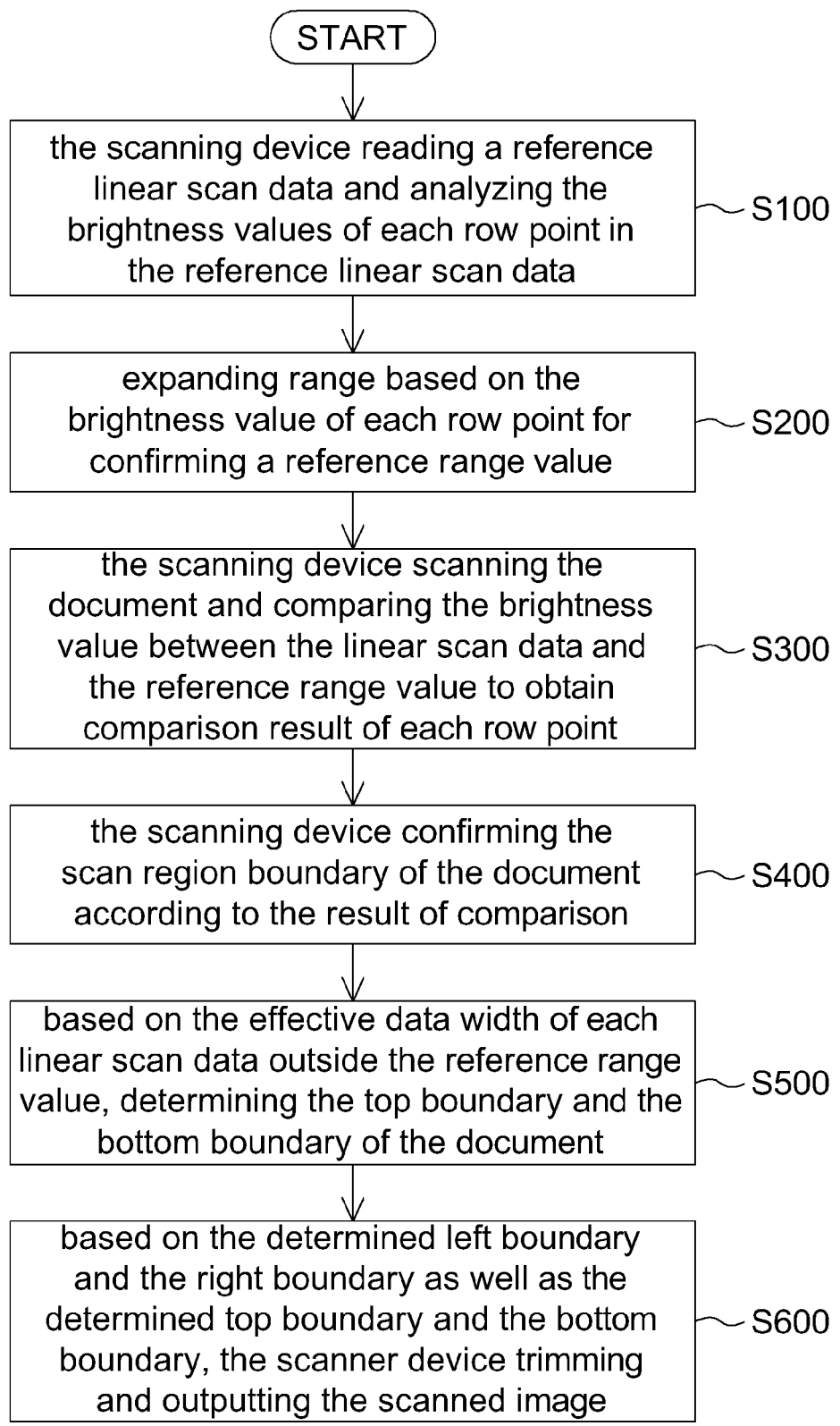
FIG. 4 shows a flow chart of a method of automatically identifying the scan region boundary according to yet another embodiment of the disclosure.
Figure 5:
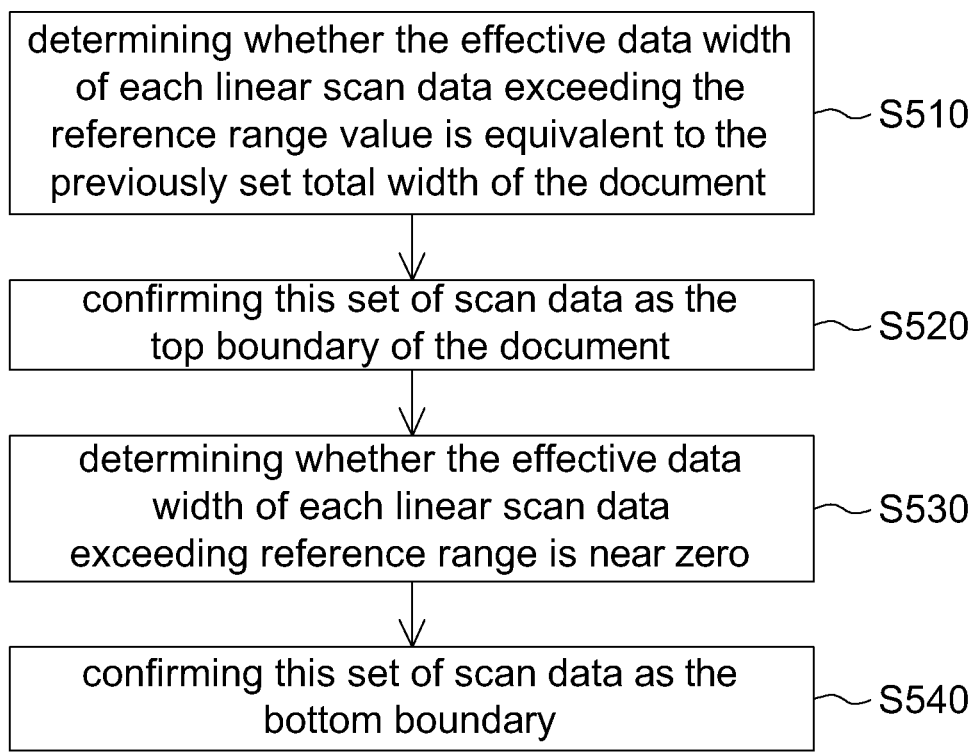
FIG. 5 shows a flow chart of step S500 of FIG. 4 according to yet another embodiment of the disclosure.

In another embodiment as indicated in FIG. 4, besides the determination of the left boundary and the right boundary as indicated in the embodiment of FIG. 1, the scanning method further determines the top boundary and the bottom boundary according to each set of linear scan data. The automatic identification and determination of the top boundary and the bottom boundary can be done either after the determination of the left boundary and the right boundary or according to the sequence by which the scan document enters the scan region. As indicated in step S500, after confirming the left boundary and the right boundary, the scanning device compares the effective data width of each linear scan data, which are outside (exceeding) the reference range value, with the width of the left boundary and the right boundary previously confirmed, so as to determine the top boundary and the bottom boundary of the document accordingly. Lastly, at step S600, based on the determined left boundary and the right boundary, as well as the determined top boundary and the bottom boundary, the scanner device trims the scanned image. In step S500, the effective data width refers to that, as for each linear scan data, the continual pixel points near the boundary whose brightness values are more likely to exceed the reference range value; and the scanning device compares the left and right effective width of the continual pixel points with the width of the left and the right boundary previously confirmed. The details of the comparison are indicated in FIG. 5. Firstly, at step S510, the scanning device determines whether the effective data width of an initial set of linear scan data exceeding the reference range value (that is, the maximum width of the continual pixel points exceeding the reference range value) is equivalent to the width of the left and the right boundary previously set. If yes, at step S520, this set of linear scan data is confirmed as a scan data related to the top boundary the document, so as to confirm the top boundary of the document. As indicated in step S530, the scanning device continues to determine whether the effective data width of each set of linear scan data exceeds the reference range value;

and if the effective data width of a set of linear scan data exceeding reference range is near zero, which means there is almost no difference between the brightness value of this current linear scan data and the corresponding reference range value, this means that, the scan module has already scanned the background region outside the document bottom end. After that, at step S540, the scanning device determines that the set of linear scan data is as a scan data related to the bottom boundary of the document, so as to confirm the bottom boundary of the document. Moreover, in a practical implementation, because a document width can be set by the scanning device, when the effective data width of the linear scan data exceeding the reference range value is near the set document width, the top boundary of the document can be confirmed. If the effective data width of one set of linear scan data exceeding the reference range is near zero, the bottom boundary of the document can be confirmed.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of automatically identifying a scan region boundary, used for scanning a document under a background, wherein the background comprises at least two primary colors:
    determining whether a document carrier is loaded into a scanning device, wherein if the document carrier is already loaded, then the scanning device reads a first linear scan data from a documentless region on the document carrier, analyzing brightness values in each row of the first linear scan data and determining a first reference range value according to the brightness values in each row; and
    during scanning a document, the scanning device comparing brightness values of a second linear scan data obtained from the document with the first reference range value so as to determine the scan region boundary.

2. The method of automatically identifying the scan region boundary according to claim 1, further comprising:
    when comparing brightness values of each second linear scan data with the first reference range value point by point, if the brightness value of a continual pixel point in the second linear scan data exceeds the first reference range value on the same physical location, the scanner device confirming a position of the continual pixel points as a left boundary or a right boundary of a scan document region of the document entering into a scan range.

3. The method of automatically identifying the scan region boundary according to claim 2, wherein the scanning device further determines physical locations of the continual points in each second linear scan data whose brightness values exceeding the first reference range value; a continual point having a leftmost physical location is determined as the left boundary of the scan document, and a continual point having a rightmost physical location is determined as the right boundary of the scan document.

4. The method of automatically identifying the scan region boundary according to claim 1, further comprising:
    when comparing brightness values of each second linear scan data with the first reference range value point by point, if the brightness values of at least two or three continual pixel points in the second linear scan data exceed the first reference range value on the same physical location, the scanner device confirming a position of the continual pixel points as a left boundary or a right boundary of a scan document region of the document entering into a scan range.

5. The method of automatically identifying the scan region boundary according to claim 4, wherein the scanning device further determines physical locations of the continual points in each second linear scan data whose brightness values exceeding the first reference range value; a continual point having a leftmost physical location is determined as the left boundary of the scan document, and a continual point having a rightmost physical location is determined as the right boundary of the scan document.

6. The method of automatically identifying the scan region boundary according to claim 1, further comprising:
    sensing and confirming whether the document enters into the scan region by a sensing element of the scanning device.

7. The method of automatically identifying the scan region boundary according to claim 1, further comprising:
    the scanning device scanning the document to obtain a plurality sets of second linear scan data, wherein the scanning device analyzes each set of the linear scan data, and confirms a top boundary and a bottom boundary of the document according to an effective data width of each set of the second linear scan data exceeding the first reference range value.

8. The method of automatically identifying the scan region boundary according to claim 7, further comprising:
    trimming and outputting a scan image by the scanning device according to the left boundary and the right boundary as well as the top boundary and the bottom boundary.

9. The method of automatically identifying the scan region boundary according to claim 1, further comprising:
    reading a reference linear scan data by the scanning device, the scanning device analyzing brightness values in each row of the reference linear scan data and determining a second reference range value according to the brightness values in each row.

10. The method of automatically identifying the scan region boundary according to claim 9, wherein the step of comparing the brightness values comprises:
    comparing the brightness values of each second linear scan data with the second reference range value on the same physical location, wherein the second reference range value is a reference range obtained by upward and downward expansion of the brightness values in each row of the reference linear scan data.

11. The method of automatically identifying the scan region boundary according to claim 9, wherein the reference linear scan data is a third linear scan data obtained by scanning the background when no document is loaded.

* * * * *